United States Patent [19]
Ahagon et al.

[11] 4,323,485
[45] Apr. 6, 1982

[54] RUBBER COMPOSITIONS FOR TIRE TREADS HAVING LOW ROLLING RESISTANCE

[75] Inventors: Asahiro Ahagon; Makoto Misawa; Kazuo Miyasaka, all of Hiratsuka; Hiroshi Hirakawa, Isehara, all of Japan

[73] Assignee: The Yokohama Rubber Co., Ltd., Tokyo, Japan

[21] Appl. No.: 134,238

[22] Filed: Mar. 26, 1980

[30] Foreign Application Priority Data

Apr. 9, 1979 [JP] Japan .................................. 54-42011

[51] Int. Cl.³ .......................... C08L 7/00; C08L 9/00; C08L 15/02; C08L 47/00
[52] U.S. Cl. ................. 525/237; 152/209 R; 525/236
[58] Field of Search .................... 260/5; 525/237, 236; 152/209 R

[56] References Cited
U.S. PATENT DOCUMENTS

| 3,857,775 | 12/1974 | Custer et al. | 260/5 |
| 3,880,821 | 4/1975 | Feniak | 260/5 |
| 3,919,130 | 11/1975 | Cohen | 260/5 |
| 3,928,259 | 12/1975 | Feniak | 260/5 |
| 3,938,574 | 2/1976 | Bormester et al. | 260/5 |
| 4,012,344 | 3/1977 | Cohen | 260/5 |
| 4,090,989 | 5/1978 | Chen | 260/5 |

Primary Examiner—Allan Lieberman
Attorney, Agent, or Firm—Jordan and Hamburg

[57] ABSTRACT

A rubber composition for tire treads having improved rolling resistance and wet road braking performance, comprising (I) a chlorinated butyl rubber and/or a brominated butyl rubber, (II) natural rubber and/or a polyisoprene rubber and, if desired, (III) a polybutadiene rubber in specific blending ratios.

3 Claims, 7 Drawing Figures

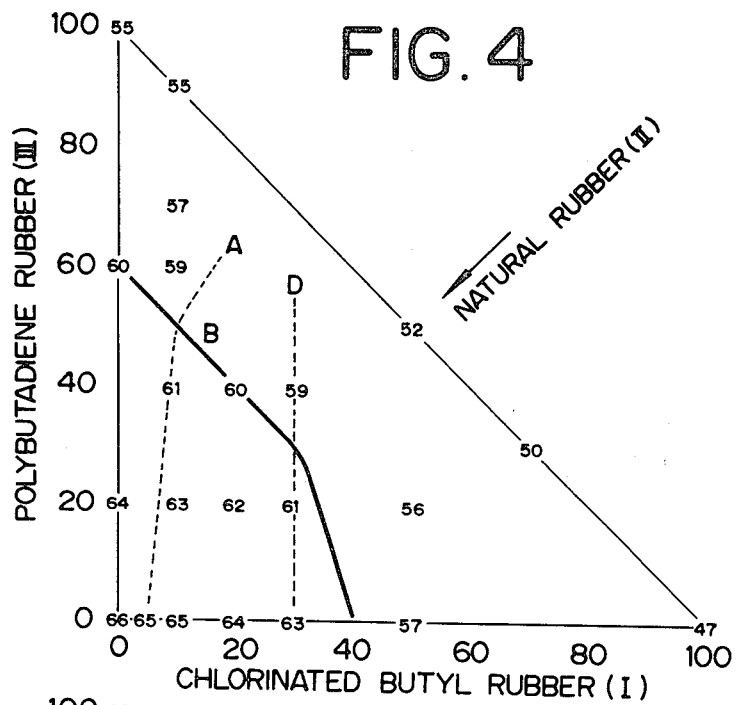
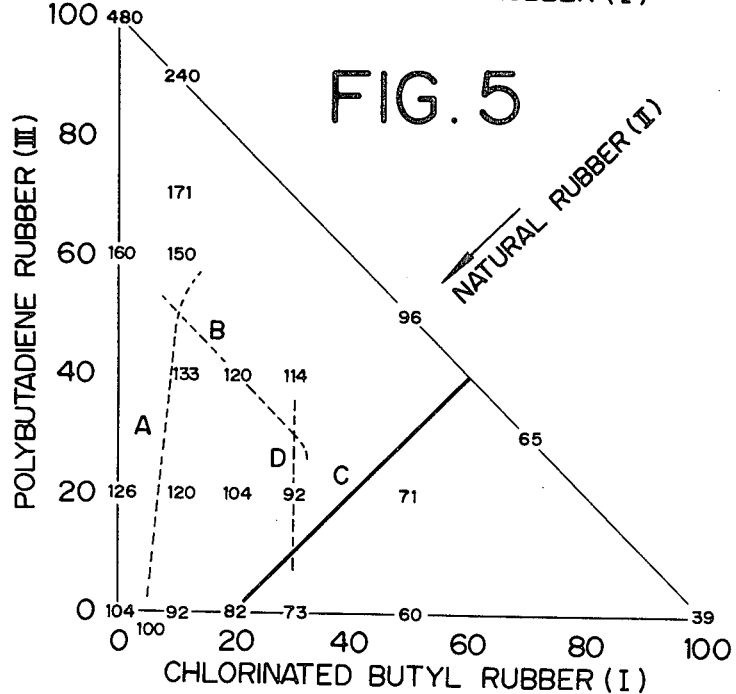

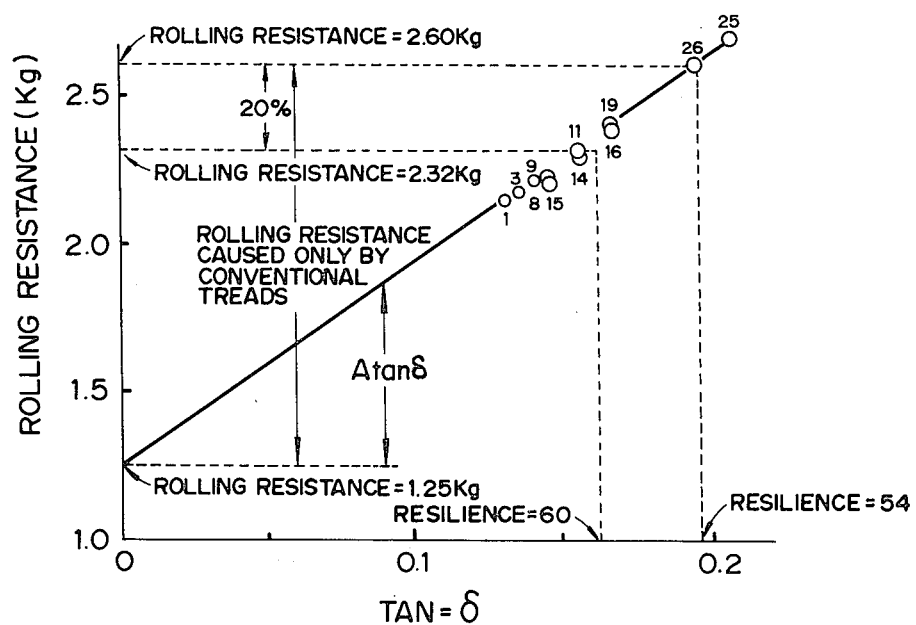
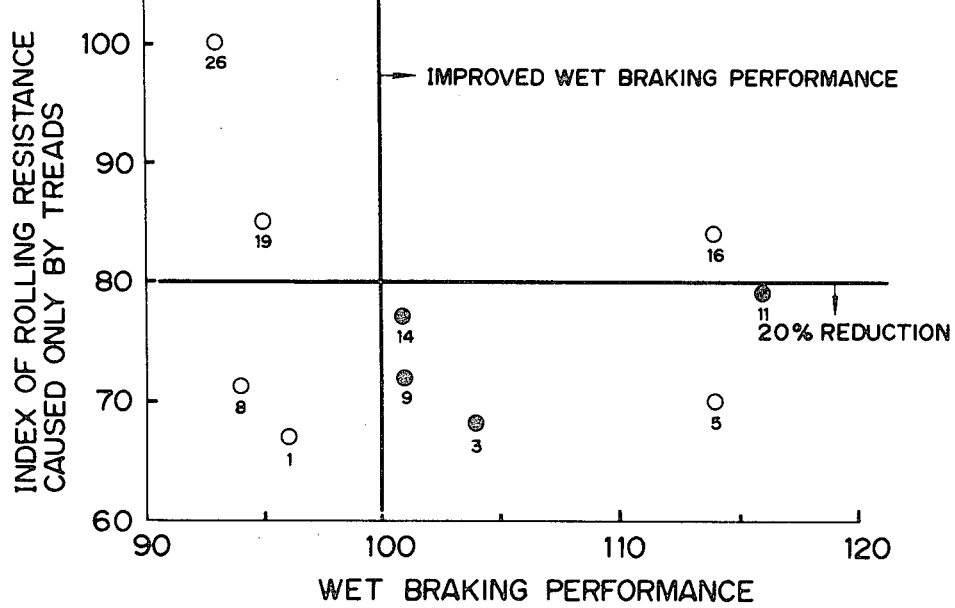

RUBBER COMPOSITIONS FOR TIRE TREADS HAVING LOW ROLLING RESISTANCE

This invention relates to a rubber composition for tire treads having low rolling resistance. More particularly, it relates to a rubber composition for tire treads having reduced rolling resistance, improved braking performance on wet roads (hereinafter referred to as "wet braking performance") and acceptable wear resistance, which comprises a chlorine- or bromine-containing polyisobutylene-isoprene rubber (hereinafter referred to as "halogenated butyl rubber"), natural rubber or polyisoprene rubber and polybutadiene rubber in specific ratios or alternatively comprises a halogenated butyl rubber and natural rubber or polyisoprene rubber in specific ratios.

From the view-point of both economy of fuel and safety in driving automobiles, automobile tires having reduced rolling resistance and improved wet braking performance have recently been earnestly sought.

It is reported that these two tire properties generally depend on the kind of rubber material for the treads of tires to an extend of about 50% and they are conflicting with each other (Transactions of IRI, Vol. 40, No. 6, pp. 239–256, for example). Tire tread rubber materials for use for producing tires having reduced rolling resistance should be such that the energy loss incurred by the load applied to the tires and the repeated deformation of the tires caused by the rotation thereof during driving cars fitted with the tires is small and, in the test of rubber materials, kinetic losses such as resilience (Lüpke Rebound) may be considered to be an indication of rolling resistance. Further, it is necessary to evaluate the resilience at about 70° C. in view of the running state of the cars; in other words, the higher the resilience at this temperature is, the lower the rolling resistance is.

On the other hand, the wet braking performance of tire treads, which is an important property in respect of safety in driving cars, may be evaluated by the use of a British portable skid tester and the values obtained correspond satisfactorily to those obtained in the field test using actual cars. In order to improve the wet braking performance, tire treads should be such that the energy loss incurred by friction resistance generated by the deformation of the tire treads which is caused in compliance with the unevenness of roads is large when the tire treads are made slipped by braking the tires on the roads. To balance the said two conflicting properties in respect of the energy loss with the wear resistance, a blend of a styrene/butadiene copolymer rubber with a polybutadiene rubber containing not more than 20% of 1,2-bonding units has generally been used as rubber material for tire treads for passenger cars. The use of the most popular styrene-butadiene rubber alone containing 15–25% by weight of styrene bonded will provide tire treads having good wet braking performance but having high rolling resistance; therefore, it is a customary practice to use a blend of said styrene-butadiene rubber with about 30 parts by weight of a polybutadiene rubber which will provide tire treads having high resilience and wear resistance but having low wet braking performance. However, such blends are unsatisfactory to meet the recent severer requirements for the fuel economy and safety in driving cars whereby is raised a serious problem as to the development of tire tread rubber material which will provide tire treads having the two conflicting properties balanced at a higher level without remarkably deteriorating the wear resistance of the tire treads in order to attain the economization of resources.

With the decrease in rolling resistance of tire treads to be produced, they will tend to have lower wear resistance. However, in the present circumstances under which the economization of resources is imperative, the economization of energy effected by an improvement in fuel consumption efficiency (Km/l) must be such that it compensates at least for a decrease in tire life as the adverse effect.

Assuming that the life of conventional tires is 50,000 Km and the automobile fuel consumption efficiency is 10 Km/l, it follows from this that 5,000 l of fuel is consumed per life of a conventional tire. Further, the amount of petroleum required to produce four of the conventional tires is calculated to be 200 l (50 l per tire). Accordingly, in automobiles, it is deemed that the total amount of petroleum consumed during the production of the four tires and life thereof is 5,200 l. By introducing this value, the above fuel consumption efficiency may be revised to 9.6 Km/l.

Assuming now that a 2% increase in fuel consumption efficiency and a 20% decrease in wear resistance are obtained by lowering the rolling resistance in tires to be produced, it follows that a revised fuel consumption efficiency is 9.7 Km/l which is better than the conventional one.

Assuming, on the other hand, that the 2% increase in fuel consumption efficiency results in a 30% decrease in wear resistance, it follows that a revised fuel consumption efficiency is 9.6 Km/l which is the same as the conventional one and indicates no improvements in economization of resources.

Since it is generally considered that, when the rolling resistance of tires is decreased, the fuel consumption efficiency is increased by about one-fifth (1/5) of the amount in % of the rolling resistance decreased, it would be necessary to decrease the rolling resistance by 10% and limit a decrease in wear resistance to within 20% in order to attain a 2% increase in automobile fuel consumption efficiency.

An object of this invention is to provide a rubber composition for producing tire treads having both reduced rolling resistance, improved wet braking performance and acceptable wear resistance, the tire treads being conducive to an improvement in fuel consumption efficiency in response to such an improvement required.

In an attempt to obtain rubber materials for tire treads meeting the aforesaid requirements, various studies were made by the present inventors. As one of the studies, the present inventors scrutinized a combination of a halogenated butyl rubber, natural rubber and a diene type synthetic rubber, as described in literature such as "Improvement of Tire Traction with Chlorobutyl Rubber, written by R. C. Keller, Tire Science and Technology, 1 (2) May (1973) pp. 190–201" and they found that tire treads having the aforementioned two conflicting properties (rolling resistance and wet braking performance) at a satisfactory level and acceptable wear resistance may be obtained from a blend comprising three main components—a halogenated butyl rubber, natural rubber or a polyisoprene rubber containing at least 90% of cis-1,4-bonding units, and a polybutadiene rubber containing not more than 20% of 1,2-bonding units—or alternatively from a blend comprising two main components—a halogenated butyl rubber and natural rubber or a polyisoprene rubber containing at least 90% of cis-1,4-bonding units, the components being comprised in specific ratios in each of the blends.

The tire treads obtained from each of these blends were found to have the above satisfactory properties by a rubber material evaluation test and a tire evaluation test.

It has heretofore not been considered to use a halogenated butyl rubber as a part of a rubber composition for tire treads since such a use thereof will result in the production of tire treads having a resilience which will remarkably decrease at room temperature, however, in reality such tire treads were found to increase in resilience when they are raised to a tire running temperature of about 70° C. It was further found that tire treads obtained from a combination of natural rubber or polyisoprene rubber and a polybutadiene rubber with a halogenated butyl rubber in specific blending ratios will exhibit an unexpected decrease in rolling resistance, an unexpected increase in wet braking performance and an acceptable wear resistance (the wear resistance being lower by less than 20% than ordinary ones).

This invention will then be explained by reference to the accompanying drawings in which:

FIG. 1 indicates the area or range in which the proportions of the rubber components comprised in the tread rubber composition of this invention are included, the area or range being defined by lines A–D, A showing the boundary for obtaining the wet braking performance of treads prepared from tread rubber compositions of this invention, B showing the boundary for keeping a 70° C. resilience at a level of at least 60, the boundary corresponding to a line showing the constitution of tread rubber compositions which will produce treads having a 20% lower rolling resistance (this resistance being caused only by the treads) than those produced from conventional tread rubber compositions, C showing the tread rubber compositions which will produce treads having a 20% lower wear resistance than those produced from conventional tread rubber compositions and D showing the maximum amount of a halogenated butyl rubber contained in tread rubber compositions which will produce treads exhibiting an effectively improved wet braking performance without greatly impairing other properties;

FIG. 4 is a graph showing the value for the resilience at 70° C. of each treads prepared from rubber compositions comprising the rubber components in various blending ratios;

FIG. 5 is a graph showing the Pico abrasion index for treads prepared from rubber compositions comprising the rubber components in various blending ratios;

FIG. 6 is a graph showing the relationship between the tan δ and value for rolling resistance of treads prepared from rubber compositions; and FIG. 7 is a graph showing the wet braking performance of test tires prepared using tread rubber compositions and the index of rolling resistance caused only by the tread portion of the tires.

The rubber composition of this invention comprises, in addition to carbon black, a vulcanization accelerator, sulphur and other additives, (I) 5–30 parts by weight of at least one member selected from the group consisting of a chlorinated butyl rubber having a chlorine content of 1.0–2.0, preferably 1.0–1.5, wt. %, a brominated butyl rubber having a bromine content of 1.0–2.0, preferably 1.8–2.0, wt. %, and a mixture thereof, (II) 40–95 parts by weight of at least one member selected from the group consisting of natural rubber and a polyisoprene rubber containing at least 90% of cis-1,4-bonding units and (III) not more than 50 parts by weight of a polybutadiene rubber with the proviso that the amount of the polybutadiene rubber (III) is at least 50 parts by weight less than 10 times, and at most 20 parts by weight less than, the amount of the halogenated butyl rubber (I) and that the total amount of the rubbers (I), (II) and (III) is 100 parts by weight (There are cases where none of the polybutadiene rubber (III) is contained in the rubber composition of this invention).

Figure 1:
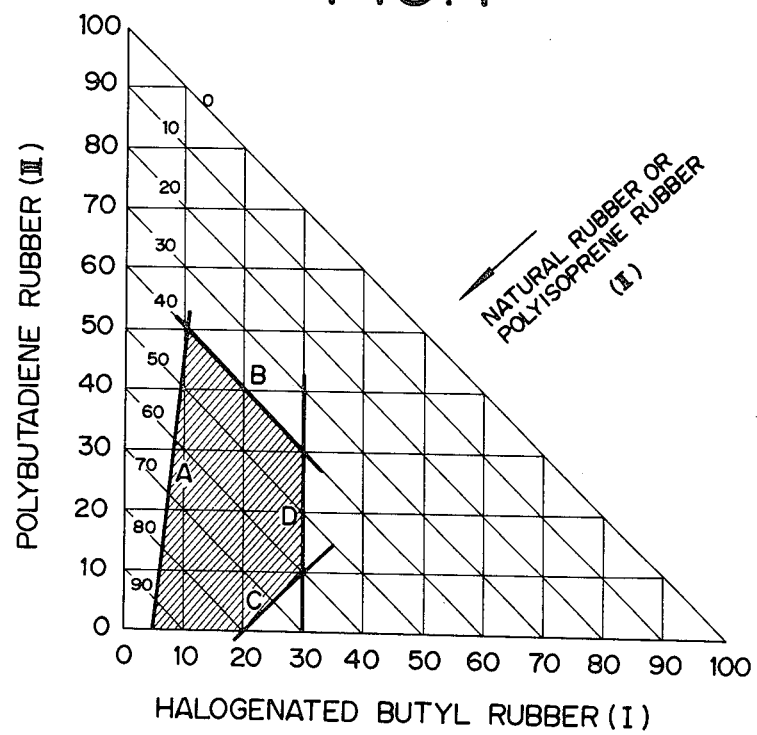

The proportions of the rubber components (I), (II) and (III) are in the range defined by the lines A, B, C and D as shown in FIG. 1, and they may be represented by the following equations.

Assuming that the mixing proportions of the rubber components (I), (II) and (III) are z, x and y, respectively, the following inequalities and equations are obtained.

$$95 \geq x \geq 40$$

$$50 \geq y \geq 0$$

$$30 \geq z \geq 5$$

$$y \leq 10z - 50 \text{ (corresponding to the line A)}$$

$$y \geq z - 20 \text{ (corresponding to the line C)}$$

$$x + y + z = 100$$

In a case where the rubber component (III) is not used in one aspect of this invention, assuming that the mixing proportions of the rubber components (I) and (II) are z and x, respectively, the following inequalities and equations are obtained.

$$5 \leq z \leq 20$$

$$80 \leq x \leq 95$$

$$x + z = 100$$

It is preferable that the rubber composition of this invention comprises, by weight, 40–70 parts of carbon black and less than 20 parts of a process oil as the main additives in addition to 100 parts of the rubber components.

The halogenated butyl rubber (I) used in this invention may be chlorinated rubber, brominated rubber or a mixture thereof, and it is necessary to use the rubber (I) in an amount of 5–30 parts by weight in order to attain the object of this invention. The line A as shown in FIG. 1 indicates the critical values for wet braking performance of tire treads prepared from the rubber compositions of this invention, and the use of the rubber component (III) in a larger amount than is indicated by said line A will result in the production of tire treads having low wet braking performance although it has improved wear resistance. Further, in the range defined by the lines A and D (line D indicating 30 parts by weight of halogenated butyl rubber), the use of the halogenated butyl rubber in an increased amount will be effective in sharply increasing the wet braking performance in the resulting tire treads; however, the rolling resistance and wear resistance will be lowered in proportion to the amount of the halogenated butyl rubber used. The use of the halogenated butyl rubber (I) in excess of 30 parts by weight (as indicated by the line D) will not be so effective in remarkably improving the resulting tire treads in wet braking performance for an increment of the amount of the halogenated butyl rubber used and, conversely, it will result in decreasing the wear resistance and increasing rolling resistance in the resulting tire treads, this being disadvantageous.

In this invention, natural rubber, a polyisoprene rubber containing at least 90% of cis-1,4-bonding units or a mixture thereof (II) is used in an amount of 40-95 parts by weight per 100 parts by weight of the whole of the rubber components. In a case where the rubber component (I) is used in an amount between those indicated by the lines A and D, the rolling resistance of the resulting tire treads will depend mainly on the amount of the rubber component (II) used; on the other hand, the use of the rubber component (I) in a larger amount will accordingly lower the rolling resistance in the resulting tire treads. In a case where the rubber components (III) and (I) are used in a larger amount than is indicated by the line B and the rubber component (II) is used in a smaller amount, the resulting tire treads will exhibit a decreased resilience at 70° C. Thus, it is impossible to decrease the rolling resistance by 10% or more in the resulting tire treads only by varying the proportions of the rubber components used. The use of the rubber component (II) in an amount of more than 95 parts by weight will result in the production of tire treads having decreased wet braking performance.

The polybutadiene rubber used as the rubber component (III) in this invention is not necessarily required to attain the object of this invention, however, the use of the rubber component (III) in an amount by weight of not more than 50% of the whole of the rubber components and in a larger amount than is indicated by the line C will be effective in inhibiting a remarkable decrease in wear resistance of the resulting tire treads prepared using, as one of the rubber components, the halogenated butyl rubber (I) in a high proportion. Novel tire treads prepared from the rubber compositions as indicated by the line C are 20% lower in wear resistance than those prepared from conventional rubber compositions, however, this disadvantage is tolerable and compensable to obtain such novel tire treads which are at least 10% lower in rolling resistance than the conventional ones and are satisfactory in wet braking performance thereby ensuring fuel economy and safety in driving automobiles fitted with the novel tire treads.

As previously mentioned, it is preferable to incorporate 40-70 parts by weight of carbon black and 0-20 parts by weight of a process oil in 100 parts by weight of a mixture of the halogenated butyl rubber (I), natural rubber or a polyisoprene rubber containing at least 90% of cis-1,4bonding units (II) and a polybutadiene rubber containing not more than 20% of 1,2-bonding units (III).

It is preferable that carbon black used in this invention should have an iodine adsorption number of at least 80 g $I_2$/Kg, however, it is undesirable to use carbon black having a lower iodine adsorption number than 80 g $I_2$/Kg since the use thereof will result in the production of tire treads having decreased wear resistance. It is preferable that carbon black be used in an amount of 40-70 parts by weight per 100 parts by weight of the rubber components. The use of less than 40 parts by weight will result in the production of tire treads having decreased rolling resistance but having inappropriate wear resistance, while the use of more than 70 parts by weight of carbon black will result in the production of tire treads having improved wear resistance but having high rolling resistance. Thus, the use of carbon black outside the range of 40-70 parts by weight is not desirable.

In this invention, the process oil should preferably be used in an amount of not more than 30 parts by weight and should preferably not be used to obtain tire treads having lowered rolling resistance. However, not more than 30 parts by weight of the process oil may be incorporated in the rubber components not to raise problems as to a rise to high temperatures, heat generation and the like otherwise caused by mixing of the rubber components in the working process.

The rubber composition comprising the rubber components (I), (II) and, if desired, the rubber component (III), may further comprise a diene type synthetic rubber, such as a styrene-butadiene copolymer prepared by emulsion polymerization or solution polymerization, in an amount by weight of 0-20% of the total amount of the rubber components (I) to (III) in order to the object of this invention.

The rubber composition of this invention may still further comprise additives, such as sulphur, zinc oxide, vulcanization accelerators, vulcanization adjuvants and anti-aging agents, which are generally used in the rubber industry.

This invention will be better understood by the following examples wherein all the parts are by weight unless otherwise specified.

EXAMPLES AND COMPARATIVE EXAMPLES

There were mixed together the rubber components and additives in the respective amounts as indicated in the following Table 1 by the use of a small-sized Banbury type mixer (volume: 1.7 l). The mixing was effected in such a manner that the Banbury type mixer in which the initial temperature of the side wall was 60° C., the rotor rotated at 40 r.p.m. and the jacket was heated to effect the mixing at 110°-120° C., was charged firstly with the rubber components and, 30 seconds thereafter and secondly with the carbon black and other additives except for the sulphur and vulcanization accelerator. The whole mass was then mixed for a total of 4.5 minutes to obtain a mixture. The mixture so obtained was blended with the vulcanization accelerator and sulphur for 4 minutes by the use of a 8-inch roll adjusted to 60° C. and then molded to obtain rubber sheets having a thickness of about 3.0 mm. The thus obtained rubber sheets were vulcanized or cured under the conditions as shown in Table 1 and then measured for their properties. In cases where the rubber composition may comprise the rubber components in widely varying proportions as in this Example, it is necessary to determine the respective optimum amounts of a vulcanization accelerator and sulphur as well as the optimum vulcanization conditions in order to obtain a vulcanized rubber product having satisfactory properties from a particular rubber composition. The variations in the additives and vulcanization conditions used as indicated in Table 1 has no effect on the selection of the rubber components.

Figure 2:
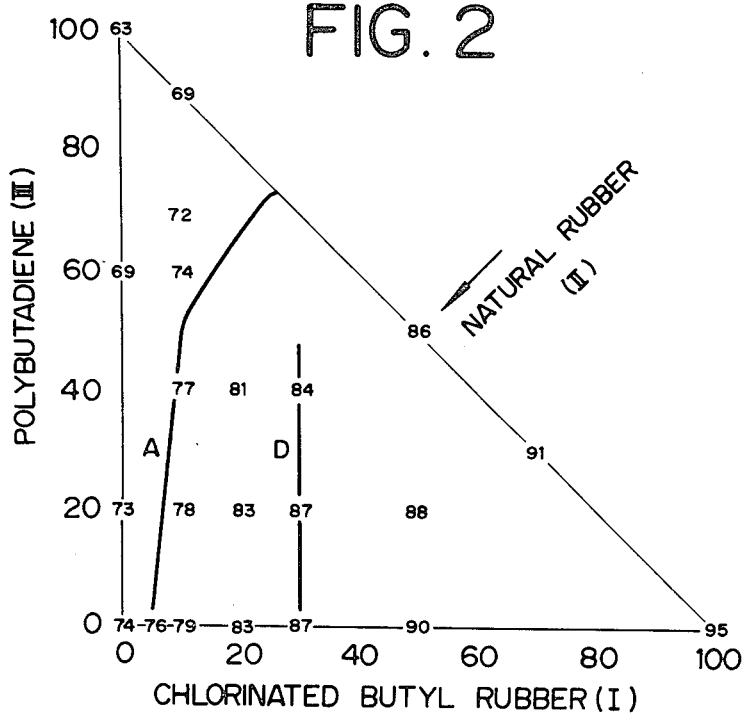
FIG. 2 is a graph showing the value for wet skid resistance exhibited by each of treads prepared from tread rubber compositions comprising the rubber components in various blending ratios.
Figure 3:
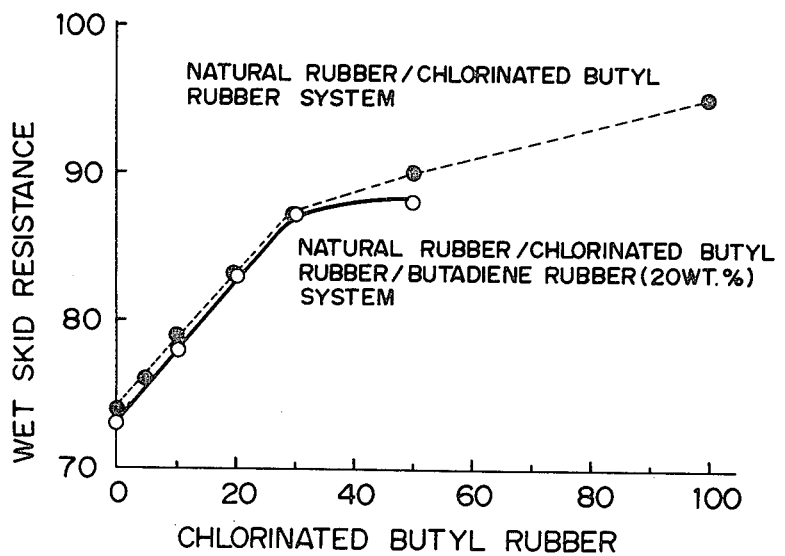
FIG. 3 is a graph showing the relationship between the amount of chlorinated butyl rubber contained in tread rubber composition and the value for wet skid resistance of treads prepared therefrom in respect of a natural rubber/chlorinated butyl rubber system and a natural rubber/chlorinated butyl rubber/poly-butadiene rubber (20 wt.%) system.

FIGS. 2, 4 and 5 each indicate the relationship between (I) the rubber constitution of rubber compositions comprising the chlorinated butyl rubber, natural rubber and polybutadiene rubber, and (II) the wet skid resistance, resilience at 70° C. and wear resistance. The line A in FIG. 2 is a contour line indicating the wet skid resistance values (76) of tire treads prepared from conventional rubber compositions comprising a styrene-butadiene copolymer rubber. From the line A, it is seen that the use of the chlorinated butyl rubber in small amounts will result in the production of tire treads having lower wet braking performance than conventional ones thereby raising a problem as to the safety. In the area or range defined by the line A and the line B (indicating 30 parts by weight of chlorinated butyl rubber) in FIG. 1, an increase in chlorinated butyl rubber used will be effective in sharply improving the resulting tire treads in wet skid resistance (FIG. 3). The use of the chlorinated butyl rubber in an amount by weight of more than 30 parts will result in the production of tire treads having slightly improved wet skid resistance for the increment of the chlorinated butyl rubber and, conversely, having remarkably decreased wear resistance and resilience at 70° C. (FIGS. 4 and 5). It is thus important that the amount of the chlorinated butyl rubber used be in the range defined by the lines A and D. Further, the chlorinated butyl rubber may be replaced by the brominated butyl rubber, and natural rubber may also be substituted by the polyisoprene rubber in attaining the object of this invention, this being apparent from the comparison of Example 5 with Examples 9 and 10.

Resilience at 70° C. is a good indication of the rolling resistance of tire treads, and it is necessary for tire treads to have a resilience of at least 60 at 70° C. (Example 1) in order that they have a rolling resistance which is 10% lower than those prepared from conventional compositions for tire treads (Comparative Example 16). The line B in FIG. 4 indicates the lower limit of the resilience. In a case where the halogenated butyl rubber is used in an amount of less than that indicated by the line D, the resilience at 70° C. will approximately depend only on the amount of the rubber component (II) used, and, in this range, the line B coincides with a line indicating 40 parts by weight of the rubber component (II). As the rubber component (II) increases in amount used, the resilience at 70° C. gradually increases; however, the use of more than 95 parts by weight thereof will result in the production of tire treads having unsatisfactory wet skid resistance, this being disadvantageous. Thus, it is required that the amount of the rubber component (II) be in the range of 40-95 parts by weight. It is apparent from Examples 5 and 10 in Table 1 that natural rubber may be substituted by the polyisoprene rubber as the rubber component (II).

FIG. 5 indicates the relationship between the rubber constitution of the rubber components (I), (II) and (III), and the wear resistance of tire treads prepared using said rubber components. The line C is a contour line indicating a wear resistance index of 82, and the use of the polybutadiene rubber in larger amounts than those for the line C will limit a decrease in wear resistance to within 20% in the resulting tire treads. The maximum amount of the polybutadiene rubber used is 50 parts by weight which is an intersection of the lines A and B. The use of this rubber in excess of the maximum amount will have adverse effects on the wet skid resistance and the resilience at 70° C.

As is seen from the foregoing, the rubber compositions comprising the rubber components in the proportions falling within the range defined by the lines A, B, C and D (FIG. 1) may be used in the production of tire treads which will exhibit fuel economy, safety and wear resistance balanced with one another when used, thereby attaining the object of this invention.

In order to prove the effectiveness of this invention in the form of tires, radial tires having a size of 165 SR 13 were prepared using the tread rubber compositions of this invention, steel cords at the belt portion of the tires to be prepared and polyester cords at the carcus portion thereof. The tread rubber compositions used here were those of Comparative Examples 1, 2, 5, 8, 11, 15 and 16 as well as Examples 2, 4, 6 and 7.

The rolling resistance and wet braking performance (this performance being expressed in terms of distance (m) over which tires run on an asphalt-paved road from the time of being braked to the time of being stopped) measured on the resulting tires under the following test conditions, are indicated in Table 1.

Measurement for Rolling Resistance:

Measurement was made three times in an atmosphere at 100° F. on a 1707 mm diameter indoor wheel with a static load of 420 Kg exerted on each of the tires inflated at an air pressure of 1.9 Kg/cm$^2$. The tires were preliminarily run at a speed of 100 Km/hr for 30 minutes and then tested three times for rolling resistance at each of 40 Km/hr, 60 Km/hr, 80 Km/hr and 100 Km/hr. The averaged value for rolling resistance at each of the speeds was obtained, and the averaged values thus obtained were then simply further averaged to obtain the averaged value at a speed between 40 Km/hr and 100 Km/hr for simple indication of rolling resistance.

Measurement for Wet Braking Performance:

The aforesaid tires were tested three times at each speed for their braking performance on a wet asphalt-paved road. The averaged values were found.

The graph in FIG. 6 is obtained by calculating tan δ from the resilience at 70° C. of tire treads in accordance with the equations indicated in "Note 11" below Table 1 and then plotting the thus obtained Tan δ against the rolling resistance of tires prepared using each of the tread rubber compositions. The value for the tan δ calculated from the resilience at 70° C. of the treads prepared from the tread rubber compositions exhibits good correspondence to the rolling resistance of the tires and, therefore, it is seen that the resilience is a good indicator of the rolling resistance. If said correspondence extrapolates as far as the point of tan δ=0 where the hysteresis loss of treads prepared from tread rubber compositions is zero, a rolling resistance of 1.25 Kg will be obtained. This value may be deemed to be rolling resistance caused by the component portion of the tire other than the portion prepared from the tread rubber composition. Accordingly, the value for the rolling resistance caused only by the tire portion prepared from the tread rubber composition, is a value obtained by subtracting 1.25 Kg from the value for the rolling resistance caused by the respective tires. Thus, in a tire prepared using a tread rubber composition which will result in producing tires having a 10% lower rolling resistance than those prepared from the conventional tread rubber composition, the rolling resistance caused only by the tread portion of the tire corresponds to rolling resistance which is 20% lower than that caused by the use of the conventional tread rubber composition. Tan δ corresponding to a rolling resistance which is 20% lower than that caused only by the tread prepared from this rubber composition, is 0.163 and corresponds to a resilience of 60 at 70° C. Accordingly, the use of tread rubber compositions which will produce tire treads having a resilience of at least 60, may reduce at least 20% of rolling resistance derived only from the aforesaid tread rubber composition as compared with the conventional tread rubber compositions.

FIG. 7 indicates the wet braking index of tires to be tested (assuming that the wet braking index of a tire prepared using the tread rubber composition of Comparative Example 15 is 100) and the rolling resistance index of the tread of the tires (assuming that the rolling resistance of a tire prepared using the tread rubber composition of Comparative Example 16 is 100).

Tread rubber compositions which will produce tire treads having a wet braking index of at least 100 and a rolling resistance index of not more than 80, corresponds to those which will produce tire treads ensuring fuel economy and safety. Such tread rubber compositions which will produce tire treads having not only the aforesaid properties but also desired wear resistance thereby attaining the object of this invention, are those of Examples 2, 4, 6 and 7 indicated by the black dots in FIG. 7; on the other hand, the tread rubber composition of Comparative Example 2 is unsatisfactory since it will produce tire treads having greatly decreased wear resistance because of its high content of the chlorinated butyl rubber. The evaluation of tires prepared using the tread rubber compositions of this invention was not effected in the examples of this invention, but a Pico abrasion test was made therein. The Pico abrasion test is well known for its accurate preestimation of the wear resistance of tires for passenger cars and, therefore, failure to estimate the wear resistance of tires in the present application will not impair the merits of this invention.

TABLE 1

| RUN NO. | 1 | 2 | 3 | 4 | 5 | 6 | 7 | 8 | 9 | 10 | 11 | 12 | 13 |
|---|---|---|---|---|---|---|---|---|---|---|---|---|---|
|  | C. Ex. 1 | Ex. 1 | Ex. 2 | Ex. 3 | C. Ex. 2 | C. Ex. 3 | C. Ex. 4 | C. Ex. 5 | Ex. 4 | Ex. 5 | Ex. 6 | C. Ex. 6 | C. Ex. 7 |
| Rubber composition, Properties of tire tread | | | | | | | | | | | | | |
| Chlorinated butyl rubber (I) Note 1 | — | 5 | 10 | 20 | 30 | 50 | 100 | — | 10 | 20 | 30 | 50 | 70 |
| Brominated butyl rubber (I) Note 2 | — | — | — | — | — | — | — | — | — | — | — | — | — |
| Natural rubber (II) Note 3 | 100 | 95 | 90 | 80 | 70 | 50 | — | 80 | 70 | 60 | 50 | 30 | — |
| Polyisoprene rubber (II) Note 4 | — | — | — | — | — | — | — | — | — | — | — | — | — |
| Polybutadiene rubber (III) Note 5 | — | — | — | — | — | — | — | 20 | 20 | 20 | 20 | 20 | 30 |
| Styrene-butadiene copolymer rubber Note 6 | — | — | — | — | — | — | — | — | — | — | — | — | — |
| Carbon black (N339) | 55 | | | | | | | | | | | | |
| Aromatic oil | 8 | | | | | | | | | | | | |
| Zinc oxide | 5 | | | | | Same as C.Ex. 1 | | | | | | | |
| Stearic acid | 2 | | | | | | | | | | | | |
| Vulcanization accelerator (NOBS) Note 7 | 0.7 | 0.8 | 0.8 | 0.8 | 0.8 | 0.8 |  | 0.8 | 0.8 | 0.8 | 0.8 | 0.8 | 0.8 |
| Vulcanization accelerator (TMTD) Note 8 | | | | | | | 0.8 | | | | | | |
| Sulphur | 2.2 | 2.0 | 2.0 | 2.0 | 2.0 | 2.0 | 1.8 | 2.0 | 2.0 | 2.0 | 2.0 | 2.0 | 2.0 |
| Vulcanization at 160° C. for (min.) | 15 | 15 | 15 | 15 | 15 | 15 | 30 | 15 | 15 | 15 | 15 | 15 | 20 |
| Properties of tire tread | | | | | | | | | | | | | |
| Resilience at 70° C. | 66 | 65 | 65 | 64 | 63 | 57 | 47 | 64 | 63 | 62 | 61 | 56 | 50 |
| Wet skid resistance Note 9 | 74 | 76 | 79 | 83 | 87 | 90 | 95 | 73 | 78 | 83 | 86 | 88 | 91 |
| Wear resistance index (%) Note 10 | 104 | 100 | 92 | 82 | 73 | 60 | 39 | 126 | 120 | 104 | 92 | 71 | 65 |
| Properties of tire (165SR13) | | | | | | | | | | | | | |
| Rolling resistance (Kg) Note 11 | 2.15 | | 2.17 | | 2.20 | | | 2.21 | 2.22 | | 2.31 | | |
| Rolling resistance caused only by tread (Kg) | 0.90 | | 0.92 | | 0.95 | | | 0.96 | 0.97 | | 1.06 | | |
| Rolling resistance index caused only by tread (%) | 67 | | 68 | | 70 | | | 71 | 72 | | 79 | | |
| Wet braking index (%) Note 12 | 96 | | 104 | | 119 | | | 94 | 101 | | 116 | | |

| RUN NO. | 14 | 15 | 16 | 17 | 18 | 19 | 20 | 21 | 22 | 23 | 24 | 25 | 26 |
|---|---|---|---|---|---|---|---|---|---|---|---|---|---|
|  | Ex. 7 | Ex. 8 | C. Ex. 8 | C. Ex. 9 | C. Ex. 10 | C. Ex. 11 | C. Ex. 12 | C. Ex. 13 | C. Ex. 14 | Ex. 9 | Ex. 10 | C. Ex. 15 | C. Ex. 16 |
| Rubber composition, Properties of tire tread | | | | | | | | | | | | | |
| Chlorinated butyl rubber (I) Note 1 | 10 | 20 | 30 | 50 | — | 10 | 10 | 10 | — | — | 20 | — | — |
| Brominated butyl rubber (I) Note 2 | — | — | — | — | — | — | — | — | — | 20 | — | — | — |
| Natural rubber (II) Note 3 | 50 | 40 | 30 | — | 40 | 30 | 20 | — | — | 60 | — | — | — |
| Polyisoprene rubber (II) Note 4 | — | — | — | — | — | — | — | — | — | — | 60 | — | — |
| Polybutadiene rubber (III) Note 5 | 40 | 40 | 40 | 50 | 60 | 60 | 70 | 90 | 100 | 20 | 20 | — | 30 |
| Styrene-butadiene copolymer rubber Note 6 | — | — | — | — | — | — | — | — | — | — | — | 100 | 70 |
| Carbon black (N339) | 55 | | | | | | | | | | | | |
| Aromatic oil | 8 | | | | | | | | | | | | |
| Zinc oxide | 5 | | | | | Same as in C.Ex. 1 | | | | | | | |
| Stearic acid | 2 | | | | | | | | | | | | |
| Vulcanization accelerator (NOBS) Note 7 | 0.8 | 0.8 | 0.8 | 0.8 | 0.8 | 0.8 | 0.8 | 0.8 | 1.0 | 0.8 | 0.8 | 1.0 | 1.0 |
| Vulcanization accelerator (TMTD) Note 8 | | | | | | | | | | | | | |

TABLE 1-continued

| Sulphur | 2.0 | 2.0 | 2.0 | 2.0 | 2.0 | 2.0 | 2.0 | 2.0 | 1.8 | 2.0 | 2.0 | 1.8 | 1.8 |
|---|---|---|---|---|---|---|---|---|---|---|---|---|---|
| Vulcanization at 160° C. for (min.) | 15 | 15 | 15 | 20 | 15 | 15 | 15 | 20 | 15 | 15 | 15 | 20 | 20 |
| Properties of tire tread | | | | | | | | | | | | | |
| Resilience at 70° C. | 61 | 60 | 59 | 52 | 60 | 59 | 57 | 55 | 55 | 62 | 62 | 52 | 54 |
| Wet skid resistance Note 9 | 77 | 81 | 84 | 86 | 69 | 74 | 72 | 69 | 63 | 83 | 83 | 76 | 72 |
| Wear resistance index (%) Note 10 | 133 | 120 | 114 | 96 | 160 | 150 | 171 | 240 | 480 | 109 | 100 | 92 | 100 |
| Properties of tire (165SR13) | | | | | | | | | | | | | |
| Rolling resistance (Kg) Note 11 | 2.29 | | 2.38 | | | 2.40 | | | | | | 2.70 | 2.60 |
| Rolling resistance caused only by tread (Kg) | 1.04 | | 1.13 | | | 1.15 | | | | | | 1.45 | 1.35 |
| Rolling resistance index caused only by tread (%) | 77 | | 84 | | | 85 | | | | | | 107 | 100 |
| Wet braking index (%) Note 12 | 101 | | 114 | | | 95 | | | | | | 100 | 93 |

Remarks:
Ex. = Example
C.Ex. = Comparative Example
Note 1: Chlorinated butyl HT-10-66 (Enjay Chemical Co.)
Note 2: Polysar Bromobutyl X 2 (Polysar Co.)
Note 3: RSS #3
Note 4: Nipol IR 2200 (Nippon Zeon Co.)
Note 5: Nipol BR 1220 (Nippon Zeon Co.)
Note 6: Nipol SBR 1502 (Nippon Zeon Co.)
Note 7: N-oxydiethylene benzothiazol-2-sulphenamide
Note 8: Tetramethyl thiuram-disulphide
Note 9: British portable skid tester - ASTM E303-74; Road surface, Outdoor type B Black Safety Walk produced by 3M Co., measured at 25° C.
Note 10: Goodrich type Pico Abrasion tester ASTM D-2228
Note 11: Values for rolling resistance are ones obtained by averaging values measured at 40-100 Km/hr
Method for calculating the rolling resistance caused only by tread:
The rolling resistance has the following relationship with the hysteresis properties of a tread:
Rolling resistance = A sin δ + B
wherein A is the strain energy of the tread, δ is a hysteresis loss angle and B is the rolling resistance caused by the portion other than the tread (J.M. Collins et al, Transactions of IRI, vol. 40 No. 6 pp. 239-256, 1964). As the materials for the tires produced herein were identical with one another except that only the materials for the treads of the tires were different from one another, the value for B was the same in any one of the tires. In a case where δ is small enough, sin δ ≈ tan δ.
Therefore, the rolling resistance may be represented by the following approximate equation:
Rolling resistance ≈ A tan δ + B   (1)
Further, the following equation is obtained from the resilience (Re) and Tan δ:

$$\tan \delta = \frac{1}{\pi} \ln \frac{Re}{100} \quad (2)$$

The value for B may be calculated from the data shown in Table 1 and the equations (1) and (2) and found to be 1.25 Kg, and, accordingly, the value for the rolling resistance caused only by the tread is one obtained by deducting 1.25 Kg from the value measured on the tire.

$$\text{Rolling resistance index (\%) caused only by the tread} = \frac{\text{Rolling resistance caused by tread of test tire}}{\text{Rolling resistance caused by tread of control tire}} \times 100\%$$

(Remarks: Control tire of Comparative Example 16)
Note 12:

$$\text{Wet braking index (\%)} = \frac{\text{Wet braking performance (distance) of control tire}}{\text{Wet braking performance (distance) of test tire}} \times 100\%$$

(Remarks: Control tire of Comparative Example 15)

As is mentioned above, the rubber composition of this invention comprising, as the rubber components, the halogenated butyl rubber (I), natural rubber or the polyisoprene rubber (II) and, if desired, the polybutadiene rubber (III) in the specific blending ratios will produce therefrom tire treads exhibiting both decreased rolling resistance and improved wet braking performance without an unacceptable decrease in wear resistance.

What is claimed is:

1. A rubber composition for tire treads having improved rolling resistance and wet road braking performance, consisting essentially of, by weight, (I) 7-30 parts of at least one member selected from the group consisting of a chlorinated butyl rubber having a 1.0-2.0 wt. % chlorine content and a brominated butyl rubber having a 1.0-2.0 wt. % bromine content, (II) 40-73 parts of at least one member selected from the group consisting of natural rubber and a polyisoprene rubber containing at least 90% of cis-1,4-bonding units and (III) at least 20 but not more than 50 parts of a polybutadiene rubber with the proviso that the total amount of the rubbers (I), (II) and (III) is 100 parts.

2. The method of improving the rolling resistance and wet road braking performance of tires which consists in forming the treads of such improved tires from a rubber composition comprising, by weight, (I) 5-30 parts of at least one member selected from the group consisting of a chlorinated butyl rubber having a 1.0-2.0 wt. % chlorine content and a brominated butyl rubber having a 1.0-2.0 wt. % bromine content, (II) 40-95 parts of at least one member selected from the group consisting of natural rubber and a polyisoprene rubber containing at least 90% of cis-1,4-bonding units and (III) not more than 50 parts of a polybutadiene rubber with the proviso that the amount of the polybutadiene rubber (III) is in a large amount than is indicated by the line C in FIG. 1 hereof and that the total amount of the rubbers (I), (II) and (III) is 100 parts.

3. The method of improving the rolling resistance and wet road braking performance of tires which consists in forming the treads of such improved tires from a rubber composition comprising, by weight, (I) 5-20 parts of at least one member selected from the group consisting of a chlorinated butyl rubber having a 1.0-2.0 wt. % chlorine content and a brominated butyl rubber having a 1.0-2.0 wt. % bromine content and (II) 80-95 parts of at least one member selected from the group consisting of natural rubber and a polyisoprene rubber containing at least 90% of cis-1,4-bonding units, the rubbers (I) and (II) totalling 100 parts.

* * * * *